United States Patent
Lukáč et al.

(10) Patent No.: US 11,568,642 B2
(45) Date of Patent: Jan. 31, 2023

(54) LARGE-SCALE OUTDOOR AUGMENTED REALITY SCENES USING CAMERA POSE BASED ON LEARNED DESCRIPTORS

(71) Applicant: ADOBE INC., San Jose, CA (US)

(72) Inventors: Michal Lukáč, San Jose, CA (US); Oliver Wang, Seattle, WA (US); Jan Brejcha, Liberec (CZ); Yannick Hold-Geoffroy, San Jose, CA (US); Martin Čadík, Pabice nad Svitavou (CZ)

(73) Assignee: Adobe Inc., San Jose, CA (US)

( * ) Notice: Subject to any disclaimer, the term of this patent is extended or adjusted under 35 U.S.C. 154(b) by 20 days.

(21) Appl. No.: 17/068,429

(22) Filed: Oct. 12, 2020

(65) Prior Publication Data

US 2022/0114365 A1 Apr. 14, 2022

(51) Int. Cl.
G06V 20/20 (2022.01)
G06N 20/00 (2019.01)
G06T 7/70 (2017.01)

(52) U.S. Cl.
CPC ............. G06V 20/20 (2022.01); G06N 20/00 (2019.01); G06T 7/70 (2017.01)

(58) Field of Classification Search
CPC .... G06K 9/00671; G06K 9/4604; G06T 7/70; G06T 2207/30244; G06T 7/73; G06T 7/00; G06T 7/246; G06T 2207/20084; G06T 17/05; G06N 20/00; G06F 3/04815; G06V 20/20; G06V 10/751; G06V 10/44; G06V 20/00

See application file for complete search history.

(56) References Cited

U.S. PATENT DOCUMENTS

2015/0063681 A1* 3/2015 Bhardwaj ............. G06F 16/532
382/154
2018/0268256 A1* 9/2018 Di Febbo ............. G06K 9/6273
(Continued)

OTHER PUBLICATIONS

Brejcha J., Lukáč M., Hold-Geoffroy Y., Wang O., Čadik M. (2020) LandscapeAR: Large Scale Outdoor Augmented Reality by Matching Photographs with Terrain Models Using Learned Descriptors In: Vedaldi A., Bischof H., Brox T., Frahm JM. (eds) Computer Vision—ECCV 2020. ECCV 2020.
(Continued)

*Primary Examiner* — Xilin Guo
(74) *Attorney, Agent, or Firm* — Shook, Hardy & Bacon L.L.P.

(57) ABSTRACT

Methods and systems are provided for facilitating large-scale augmented reality in relation to outdoor scenes using estimated camera pose information. In particular, camera pose information for an image can be estimated by matching the image to a rendered ground-truth terrain model with known camera pose information. To match images with such renders, data driven cross-domain feature embedding can be learned using a neural network. Cross-domain feature descriptors can be used for efficient and accurate feature matching between the image and the terrain model renders. This feature matching allows images to be localized in relation to the terrain model, which has known camera pose information. This known camera pose information can then be used to estimate camera pose information in relation to the image.

20 Claims, 12 Drawing Sheets

(56) References Cited

U.S. PATENT DOCUMENTS

2019/0147221 A1* 5/2019 Grabner .................... G06T 7/75
382/103
2019/0147619 A1* 5/2019 Goldman .............. B64C 39/024
382/154

OTHER PUBLICATIONS

Balntas, V., Lenc, K., Vedaldi, A., & Mikolajczyk, K. (2017). HPatches: A benchmark and evaluation of handcrafted and learned local descriptors. In Proceedings of the IEEE Conference on Computer Vision and Pattern Recognition (pp. 5173-5182).

Brejcha, J., & Cadik, M. (Sep. 2018). Camera orientation estimation in natural scenes using semantic cues. In 2018 International Conference on 3D Vision (3DV) (pp. 208-217). IEEE.

Saurer, O., Baatz, G., Koser, K., & Pollefeys, M. (2016). Image based geo-localization in the alps. International Journal of Computer Vision, 116(3), 213-225.

* cited by examiner

LARGE-SCALE OUTDOOR AUGMENTED REALITY SCENES USING CAMERA POSE BASED ON LEARNED DESCRIPTORS

BACKGROUND

Augmented reality systems typically rely on information denoting geography of a physical scene in order to facilitate accurate display of virtual content within the physical scene. Oftentimes, tracking camera pose (e.g., position and orientation) is used for accurately rendering the virtual content correctly in relation to the physical scene. This tracking is usually accomplished based on various device sensors, such as, for example, active depth sensors, stereo camera or multiview geometry from monocular video. However, such approaches are limited in operational range due to various constraints (e.g., light falloff for active illumination, stereo baselines, and/or camera parallax for multiview methods).

SUMMARY

Embodiments of the present disclosure are directed towards an augmented scene system for facilitating large-scale augmented reality in relation to outdoor scenes using estimated camera pose information. In particular, camera pose information for an image can be estimated by matching the image to a rendered ground-truth terrain model with known camera pose information. To match images with such renders, data driven cross-domain feature embedding can be learned using a neural network. Cross-domain feature descriptors can then be used for efficient and accurate feature matching between the image and the terrain model renders. This feature matching allows to estimate the camera pose of the images in relation to the terrain model.

In operation, an image can be input into the augmented scene system such that the cross-domain embedding function is used as part of estimating camera pose for the image. In particular, descriptors (e.g., image descriptors) can be generated for the image using a neural network (e.g., based on image patches around keypoints in the image). In addition, a rough estimate can be determined as to where the image was taken using information related to this input image (e.g., GPS information). This information can be used to generate a set of renders (e.g., 12 renders from the terrain model) related to the location of the input image. Descriptors (e.g., render descriptors) can also be generated for each of the set of renders using the neural network (e.g., using render patches around keypoints in the set of renders). These image descriptors and render descriptors can then be compared (e.g., matched) to determine similarity. Top matching renders are used to select the candidate camera pose, which is used to reduce the number of keypoints from the rendered images. Keypoints (eg., rendered keypoints) visible by the candidate camera are matched in a following step, which enables estimation of a refined (eg., more precise) camera pose. The camera pose can be estimated given the matched keypoints.

DETAILED DESCRIPTION

Figure 1A:
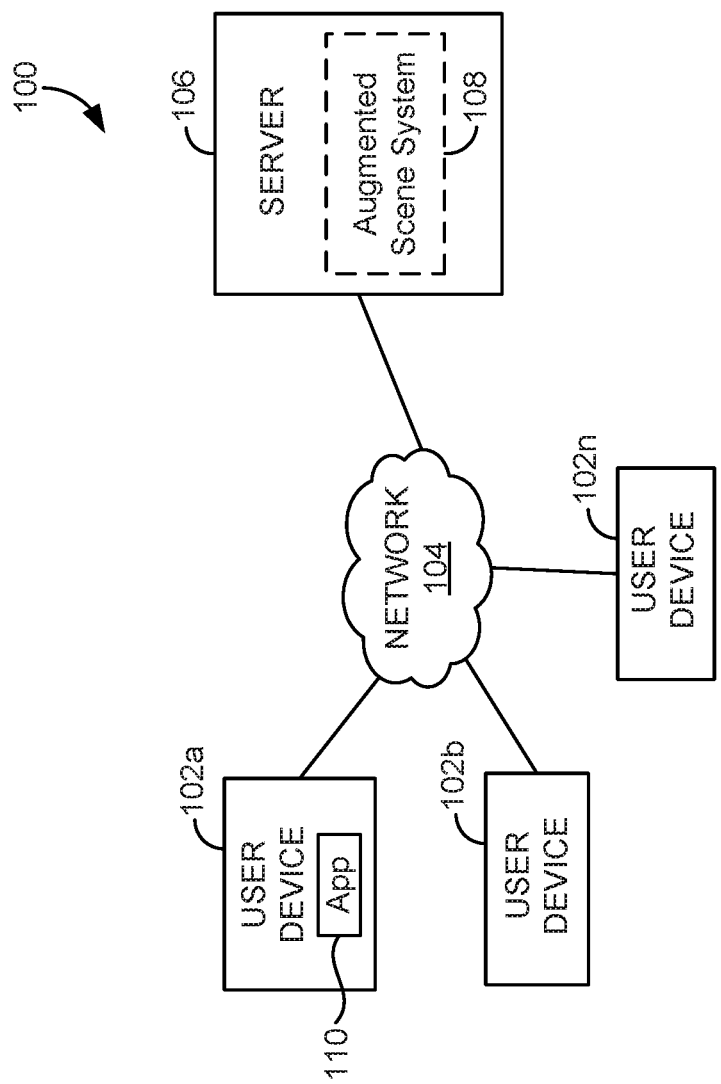
FIG. 1A depicts an example configuration of an operating environment in which some implementations of the present disclosure can be employed, in accordance with various embodiments of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, users desire additional content to be added to images. Such content can be experienced using, for example, augmented reality. For example, an overlay or virtual content can be added to an image to create an augmented reality image scene. When generating an augmented reality image scene, it is important to incorporate virtual information into the physical scene based on the geometry of local terrain as well as using a relative positon of a camera capturing the physical scene. In indoor scenes, such information can often be determined by assuming a planar floor and using device sensors (e.g., depth cameras, etc.) to estimate geometry and camera pose (e.g., position and orientation of the camera). However, device sensors often fail to provide adequate information in outdoor environments and/or at larger distances when geometry ceases to be planar.

Accordingly, embodiments of the present disclosure are directed to facilitating large-scale augmented reality in relation to outdoor scenes. In particular, an image can be matched to a rendered ground-truth terrain model (e.g., digital elevation model ("DEM")) from which camera pose information can be estimated. For instance, data driven cross-domain feature descriptors can be used for efficient and accurate feature matching between the image and the terrain model. This feature matching allows images to be localized using long-distance cues from the terrain model. Such localization in relation to the terrain model, which has known camera pose information, can then be used to estimate camera pose information in relation to the image. Using this camera pose information allows for large-scale augmented reality overlays to be displayed on images of large-scale outdoor scenes. Advantageously, such overlays on large-scale outdoor scenes allows information to be presented that includes altitude contour lines, map features (e.g., roads, trails, etc.), and/or three-dimensional created content (e.g. educational geographic-focused features).

At a high level, to allow large-scale augmented reality information to be applied to outdoor scenes, data driven cross-domain feature embedding can be learned. For instance, data driven cross-domain feature embedding by an augmented scene system can be learned using a neural network system (e.g., an augmented scene system). A neural network system can be comprised of one or more neural networks. A neural network is a computational approach loosely based on how the brain solves problems using large clusters of connected neurons. Neural networks are self-learning and trained to generate output reflecting a desired result. As described herein, the augmented scene system can be trained using at least one neural network. For example, a branched neural network can be used. This branched network can be comprised of two branches, one branch for each of input domains (e.g., a first branch related to input images) and a second branch related to the terrain model, followed by a shared trunk. Although generally described as one branched neural network, any number of neural networks can be trained in accordance with embodiments described herein.

By training and utilizing a neural network, in accordance with the systems and methods described herein, the augmented scene system implements a robust cross-domain embedding function. This cross-domain embedding function allows for efficient and accurate feature matching between input images and the terrain model. For instance, an image input into the neural network can be localized in relation to the terrain model by matching features of the image with features of the terrain model. Using this matching, known camera pose information related to the related frame of the terrain model can be used to estimate camera pose information related to the image.

Training data for training such a neural network can comprise accurately aligned pairs of images (e.g., photographs) and renders from a terrain model (e.g., DEM renders). Collections of internet images can be leveraged for such training. However, such internet images often contain unreliable location annotations. As such, for each training photograph, precise camera pose information can be determined by aligning the images with the terrain model. For example, a guided Structure-from-Motion technique can be used to align images with renders based on the terrain model for use as training data. Paired images and renders can then be used to train the network. These pairs of images and renders can be used to train the neural network such that the output of the neural network (e.g., descriptors) align the images and renders from a terrain model. In this way, the neural network can learn the cross-domain embedding function such that when an image is input into the neural network, it can be aligned in relation to renders from a terrain model (e.g., that can be used to estimate camera pose information).

The neural network can be trained by evaluating different types of loss to determine any errors or discrepancies therebetween, as described in more detail below. Errors can include inaccuracies, flaws, variations, and/or divergences between the descriptors output by the neural network that represent each of the paired images and renders. Such errors can be determined by comparing the descriptor from an image and the descriptor from a render. In some embodiments, updating the neural network involves feeding errors back through the neural network so the algorithm can adjust network connections in order to reduce the value of the error.

Adjusting the neural network to correct for errors is accomplished by changing at least one node parameter of such a neural network. The neural network can comprise a plurality of interconnected nodes with a parameter, or weight, associate with each node. Each node receives inputs from multiple other nodes and can activate based on the combination of all these inputs, for example, when the sum of the input signals is above a threshold. The parameter can amplify or dampen the input signals. For example, a parameter could be a value between zero and one. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation. Errors can be determined, for example, using loss functions. Errors determined using loss functions are used to minimize loss in the neural network by backwards propagation of such errors through the network.

In embodiments, errors can be determined by evaluating cross-domain triplet loss. Cross-domain triplet loss can generally be defined as using an image as an anchor with positive patches (e.g., known matching portion) and negative patches (e.g., known portions that do not match) as related to patches of renders. Such a loss function allows for optimization between the image and render descriptors. In some embodiments, the loss functions can further comprise a variant with auxiliary loss functions that can be used to optimize distances between image-image and render-render descriptors.

An image can be input into the augmented scene system such that the cross-domain embedding function is used as part of estimating camera pose for the image. In particular, the trained neural network, as described herein, can be used to generate descriptors for the image. For example, patches around keypoints in the input image can be input into the trained neural network to generate descriptors. In addition, based on information related to this input image (e.g., GPS information), a rough estimate can be determined as to where the image was taken. This information can be used to generate a set of renders (e.g., 12 renders) related to the location of the input image. The trained neural network can also be used to generate descriptors for each of the set of renders. For example, patches around keypoints in each of the set of renders can be input into the trained neural network to generate descriptors. These image descriptors and render descriptors can then be compared (e.g., matched to determine similarity). In this way, the cross-domain embedding function of the model can be used to find matching patches between the input image and the renders (e.g., using descriptor matching).

Using descriptor matching, a set of top candidate renders can be determined. These top candidates can be the best matches between the input image and the renders. To determine the best matches, a voting strategy can be used. For example, this voting strategy can be used to determine a number of mutual nearest neighbor matches of the renders with the input image. To determine such mutual nearest neighbor matches, a difference between the renders descriptors and the image descriptor can be used (e.g., Euclidean difference).

For each of the top candidates, the two-dimensional points from the rendered images can be unprojected to three-dimensions using rendered camera parameters and a depth map. For instance, two-dimensional points related to a rendered image can be mapped to corresponding three-dimensional points from the terrain model. Then a full camera pose can be determined for the input image with respect to the three-dimensional coordinates (e.g., using 2D-3D matches and/or intrinsic parameters of the camera, such as focal length). This determination will determine the "best pose" and can be made using, for example, an OpenCV implementation of EpnP algorithm. Finally, the matches can be reprojected into the camera plane using the best pose. The matches that are within the frame of the input image can be selected. In some embodiments, the matching process can be repeated to obtain a refined pose. For instance, the matching process and EpnP can be repeated.

In embodiments, the input image can be augmented. For instance, the estimated camera pose can be used to augment information in relation to the input image. Such augmented information can include, for example, an overlay on the input image. This overlay can display information such as altitude contour lines, map features (e.g., roads, trails, etc.), and/or three-dimensional created content (e.g. educational geographic-focused features, animated 3D content changing in time, etc.).

Turning to FIG. 1A, FIG. 1A depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 11.

It should be understood that operating environment 100 shown in FIG. 1A is an example of one suitable operating environment. Among other components not shown, operating environment 100 includes a number of user devices, such as user devices 102a and 102b through 102n, network 104, and server(s) 106. Each of the components shown in FIG. 1A may be implemented via any type of computing device, such as one or more of computing device 1100 described in connection to FIG. 11, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. The network 104 may be any network that enables communication among machines, databases, and devices (mobile or otherwise). Accordingly, the network 104 may be a wired network, a wireless network (e.g., a mobile or cellular network), a storage area network (SAN), or any suitable combination thereof. In an example embodiment, the network 104 includes one or more portions of a private network, a public network (e.g., the Internet), or combination thereof. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 11. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, a virtual reality hardware platform, augmented reality hardware platform, mixed-reality hardware platform, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 106 in carrying out large-scale augmented reality in relation to outdoor scenes.

For instance, to facilitate such large-scale augmented reality, the application(s) can be used to determine a camera pose (e.g., position and orientation of a camera in a three-dimensional space). In some implementations, the application(s) comprises a web application, which can run in a web browser, and could be hosted at least partially on the server-side of environment 100. In addition, or instead, the application(s) can comprise a dedicated application, such as an application capable of determining camera pose and/or having augmented visualization functionality. For example, such an application can be configured to determine position and orientation of a camera in a three-dimensional space (e.g., camera pose). Such an application can also be capable of displaying a rendered augmented reality in relation to an outdoor scene utilizing a determined camera pose. In some cases, the application is integrated into the operating system (e.g., as a service). It is therefore contemplated herein that "application" be interpreted broadly.

The user device can communicate over a network 104 with a server 106 (e.g., a Software as a Service (SAAS) server), which provides a cloud-based and/or network-based augmented scene system 108. The augmented scene system 108 of server 106 may communicate with one or more user devices and corresponding user interface(s) to facilitate large-scale augmented reality in relation to outdoor scenes via the user device using, for example, application 110. For instance, the augmented scene system 108 can communicate with the user devices to facilitate determining position and orientation of a camera in a three-dimensional space (e.g., camera pose). The augmented scene system 108 may further communicate with the user devices to facilitate visualization of a rendered augmented reality in relation to an outdoor scene utilizing a determined camera pose.

As described herein, server 106 can facilitate large-scale augmented reality in relation to outdoor scenes via augmented scene system 108. Server 106 includes one or more processors, and one or more computer-readable media. The computer-readable media includes computer-readable instructions executable by the one or more processors. The instructions may optionally implement one or more components of augmented scene system 108, described in additional detail below.

Application 110 may be utilized by a user to interface with the functionality implemented on server(s) 106, such as augmented scene system 108. In some cases, application 110 comprises a web browser. Application 110 can also comprise an application on a device capable of facilitating a user experience related to virtual reality, augmented reality, and/or mixed reality. In other cases, server 106 may not be required, as further discussed with reference to FIG. 1B.

Thus, it should be appreciated that augmented scene system 108 may be provided via multiple devices arranged in a distributed environment that collectively provide the functionality described herein. Additionally, other components not shown may also be included within the distributed environment. In addition, or instead, augmented scene system 108 can be integrated, at least partially, into a user device, such as user device 102a.

Figure 1B:
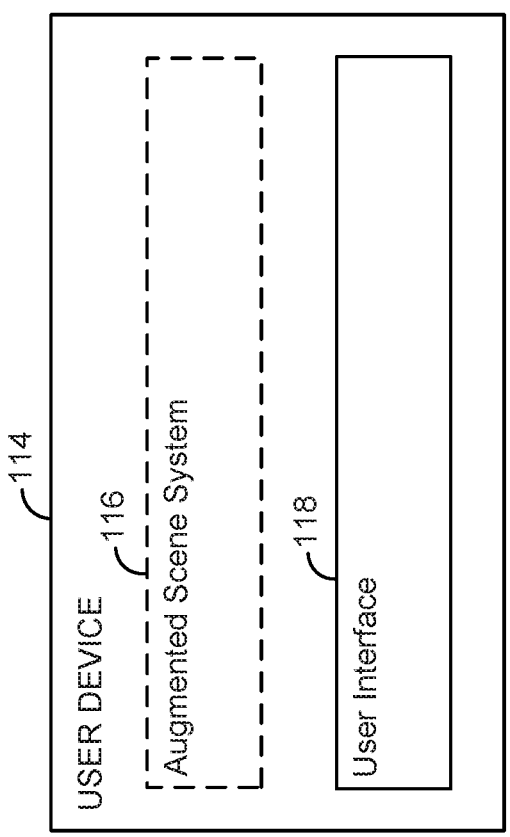
FIG. 1B depicts an example configuration of an operating environment in which some implementations of the present disclosure can be employed, in accordance with various embodiments of the present disclosure.

Referring to FIG. 1B, aspects of an illustrative augmented scene system are shown, in accordance with various embodiments of the present disclosure. FIG. 1B depicts a user device 114, in accordance with an example embodiment, configured to allow for augmented scene system. The user device 114 may be the same or similar to the user device 102a-102n and may be configured to support the augmented scene system 116 (as a standalone or networked device). For example, the user device 114 may store and execute software/instructions to facilitate interactions between a user and the augmented scene system 116 via the user interface 118 of the user device.

A user device can be utilized by a user to facilitate large-scale augmented reality in relation to outdoor scenes. In particular, a user can select a virtual-based experience for visualization utilizing user interface 118. A virtual experience can be selected or input in any manner. The user interface may facilitate the user accessing one or more stored virtual-based experiences on the user device (e.g., in an augmentation library), and/or import virtual-based experiences from remote devices and/or applications. The user interface may also facilitate the type of visual-based experience (e.g., virtual reality, augmented reality, and/or mixed reality). Based on the selected virtual-based experience, a rendered augmented reality can be generated in relation to an outdoor scene using various techniques, some of which are further discussed below with reference to augmented scene system 204 of FIG. 2. User device 114 can also be utilized for displaying a rendered visualization of an augmented environment and/or outdoor scene(s) utilizing position and orientation of a camera in a three-dimensional space (e.g., camera pose) determined using various techniques, some of which are further discussed below with reference to augmented scene system 204 of FIG. 2.

Figure 2:
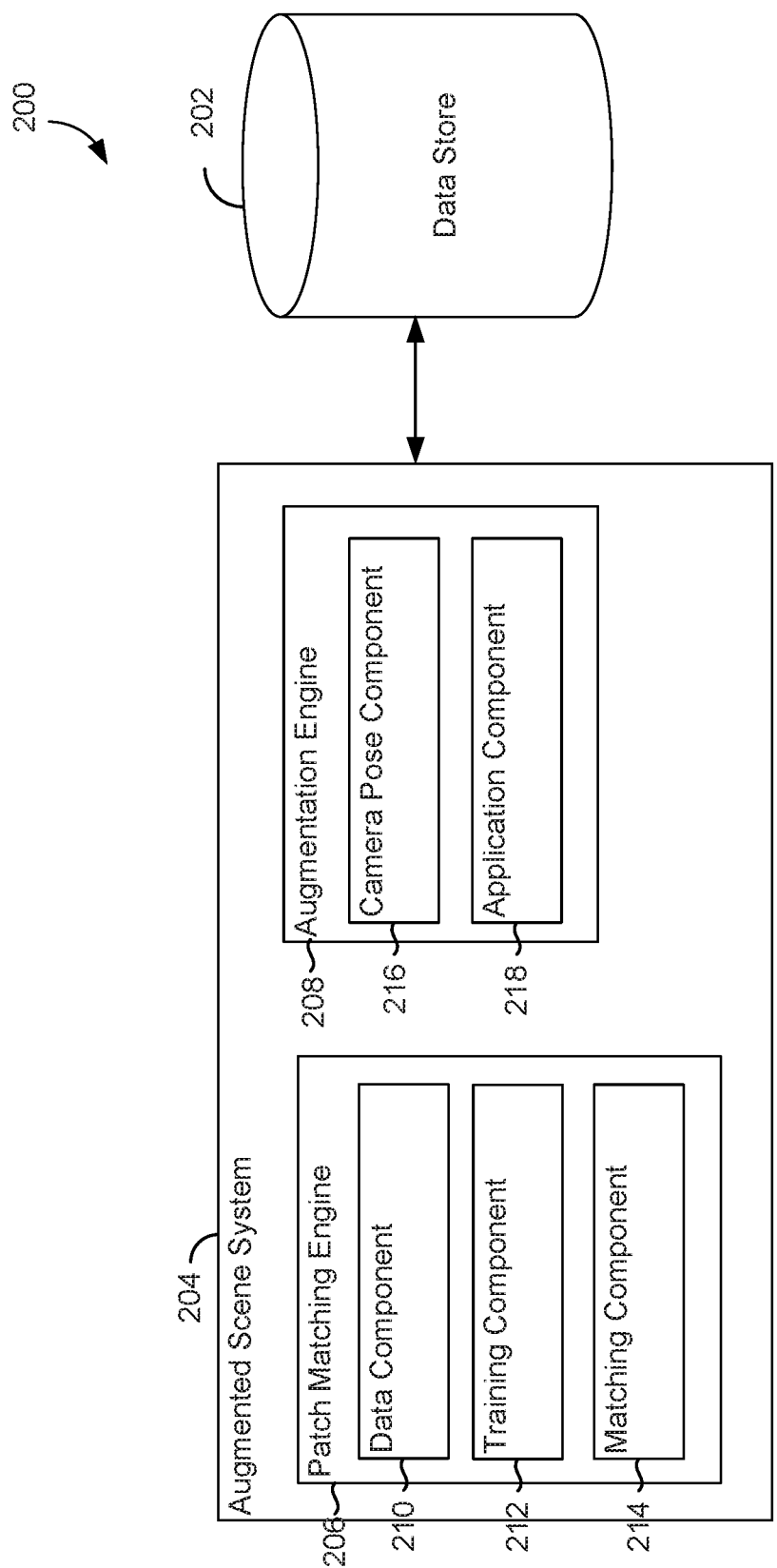
FIG. 2 depicts aspects of an illustrative augmented scene system, in accordance with various embodiments of the present disclosure.

Referring to FIG. 2, aspects of an illustrative augmented scene environment 200 are shown, in accordance with various embodiments of the present disclosure. Augmented scene system 204 includes patch matching engine 206 and augmentation engine 208. The foregoing engines of augmented scene system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the patch matching engine and augmentation engine are depicted as separate engines, it should be appreciated that a single engine can perform the functionality of both engines. Additionally, in implementations, the functionality of the engines can be performed using additional engines and/or components. Further, it should be appreciated that the functionality of the engines can be provided by a system separate from the augmented scene system.

As shown, an augmented scene system can operate in conjunction with data store 202. Data store 202 can store computer instructions (e.g., software program instructions, routines, or services), data, and/or models used in embodiments described herein. In some implementations, data store 202 can store information or data received via the various engines and/or components of augmented scene system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 can include augmentation information a user can explore during an augmented reality-based experience. Such augmentation information can be input into data store 202 from a remote device, such as from a server or a user device. This augmentation information can comprise any type of information that adds context to a scene. For example, augmentation information for an outdoor scene can include information needed to visualize any of contour lines, gravel roads, trails, Data stored in data store 202 can also include outdoor scenes related to the augmentation information. Such outdoor scenes can include associated properties, such as, for example, camera pose of the scene (e.g., position and orientation of a camera in a three-dimensional space). Data stored in data store 202 can further include other attributes or information associated with viewing an augmented outdoor scene and or camera pose.

Augmented scene system 204 can generally be used for facilitating large-scale augmented reality in relation to outdoor scenes. Specifically, the augmented scene system can be configured for determining position and orientation of a camera in a three-dimensional space (e.g., camera pose). Such position and orientation of a camera can be used for accurately rendering augmented reality information in relation to an outdoor scene. Using data driven cross-domain feature descriptors between an image and the terrain model for efficient and accurate feature matching, importantly, allows for accurate determination of position and orientation of the camera using known camera pose information related to the terrain model. In particular, such feature matching allows images to be localized to the terrain model using long-distance cues. This localization then allows for large-scale augmented reality overlays to be displayed on the images of outdoor scenes.

Augmentation information can be accessed or referenced by augmented scene system 204 for displaying an augmented reality visualization in relation to an outdoor scene utilizing a determined camera pose. In this regard, the augmented scene system 204 may access or retrieve augmentation information in relation to an outdoor scene currently being viewed by a user, via a user device. As another example, the augmented scene system 204 may receive augmentation information from data store 202 and/or from a remote device, such as from a server or a user device. The visualization of the augmentation information in relation to the outdoor scene can be performed in any number of ways, as discussed herein. For example, position and orientation of a camera in a three-dimensional space can be determined using feature matching based on data driven cross-domain feature descriptors between an image and a terrain model.

Patch matching engine 206 can generally be used to obtain training data, train a robust cross-domain embedding function using the training data, and/or use the cross-domain embedding function. As shown, patch matching engine 206 can include data component 210, training component 212, and matching component 214. The foregoing components of the dynamic mapping engine can be implemented, for example, in operating environment 100 of FIG. 1A and/or operating environment 112 of FIG. 1B. In particular, these components may be integrated into any suitable combination of user devices 102a and 102b through 102n and server(s) 106 and/or user device 114. It should be appreciated that while data component, training component, and matching component are depicted as a separate components, in implementations, the functionality of these components can be performed using a single components and/or additional components.

Data component 210 can be utilized to obtain training data for use in training a robust cross-domain embedding function. For instance, such training data can comprise accurately aligned pairs of images (e.g., photographs) and renders from a terrain model (e.g., DEM renders). Manually annotating camera poses is often tedious and is prone to errors. In addition, capturing diverse training data along with accurate camera pose information can be difficult. As such, collections of internet images can be leveraged. Advantageously, such collections of internet images are highly diverse. However, such internet images often contain unreliable location annotations. As such, for each training photograph, precise camera pose information can be determined. As used herein, camera pose information can comprise camera translation (e.g., t), rotation (e.g., R), and intrinsic parameters (e.g., K) with respect to a reference frame of a virtual globe.

In some embodiments, a guided Structure-from-Motion technique can be used to align images with a terrain model for use as training data. In particular, images from a collection of internet images can be input. These images can have viewpoint changes, different weather and seasonal changes, and/or different illumination. Such images can be input within a given rectangle of 10×10 km. For the same area, panoramic images can be rendered that are sampled 1 km apart on a regular grid. For each sampled position, a set of images can be rendered (e.g., renders). As an example, six renders can be generated with a 60° field-of-view each rotated 60° around a vertical axis. In addition, for each render, corresponding information can be stored. Such corresponding information can comprise a depth map, full camera pose, detected keypoints, and/or descriptors. Such keypoints and/or descriptors can be obtained using, for example, a baseline feature descriptor such as D2Net. Further, for the renders, matches can be determined using terrain geometry using the stored camera poses and depth maps. Such techniques are further described herein with reference to at least FIG. 7.

In addition, keypoints and descriptors can be extracted from the images from the collection of internet images. For example, such keypoints and/or descriptors can be obtained using, for example, the baseline feature descriptor such as D2Net. The input images can then be matched with other images and the renders using descriptor matching. As used herein, descriptor matching can generally be the comparison of descriptors from a first image and a second image. Such descriptors can generally be represented using, for example, a feature vector and/or feature map. These images can be any combination of input images (e.g., photos of an outdoor scene) and/or renders (e.g., rendered images of a synthetic view of an outdoor scene).

Further, the input images can be localized to the terrain model using Structure-from-Motion. Global bundle adjustment can then be used to refine camera parameters belonging to the images and three-dimensional points. Global bundle adjustment can generally be simultaneously refining three-dimensional coordinates describing scene geometry when given a set of images that depict a number of three-dimensional points from different viewpoints. The renders have fixed camera parameters because the parameters are known. Additionally, the location of reconstructed photos from the terrain model can be checked. In embodiments, photos that are taken below, or more than, 100 m above the terrain can be discarded due to likelihood that the photos are not localized precisely. Advantageously, discarding such photos can result in a more robust dataset for use in training. In particular, using such a dataset for training results in a system capable of accurately geo-registering images in tested regions.

Using such a guided Structure-from-Motion technique can generate training data that aligns input images (e.g., photos) with renders (e.g., rendered images from a terrain model). Such training data can then be used in training a robust cross-domain embedding function. This cross-domain embedding function can be used to align an input image with a portion of a terrain model. Such alignment can be used to determine precise camera pose information, as discussed further herein.

To select training data for use in training the cross-domain embedding function, a weakly supervised patch sampling method can be used that is independent of the keypoint detector. This can result in avoiding bias in the system. Using such an approach is advantageous in the cross-domain approach of the present system because the accuracy of existing keypoint detectors in cross-domain matching can be unknown. In addition, the embedding function of the system can be used with any keypoint detector without the need for re-training the system.

Each image in the dataset can contain a ground-truth camera pose (e.g., P=K[R|t]) which can transform synthetic world coordinates into the camera space. In particular, for each image (e.g., $I_{p1}$), a synthetic image (e.g., $I_{r1}$) can be rendered along with a depth map (e.g., $D_1$). Pairs of cameras can be selected that have at least 30 corresponding three-dimensional points in a Structure-from-Motion reconstruction. For instance, for each pair, a camera pose and depth map can be used to un-project image pixels into a dense three-dimensional model. Next, for each domain, the three-dimensional points visible in both views can be kept while those outside such visibility can be discarded. Further, a center of a local image patch can be defined by uniformly sampling a number of random correspondences. Such techniques are further described herein with reference to at least FIG. 8.

Training component 212 can be utilized to train a model with a cross-domain embedding function. In particular, to account for appearance differences between the two domains (e.g., images and terrain model), a branched network can be used for the architecture of the model. This branched network can be comprised of two branches, one branch for each of the input domains (e.g., input images and terrain model) followed by a shared trunk. In embodiments, the architecture of the branched network can be a fully convolutional network with a receptive field of 63 px. To obtain a descriptor using the network, an input patch with size 64×64 can be used. This input patch to the network can be normalized. For instance, the input patch can be normalized by subtracting the mean and dividing by its standard deviation. Advantageously, such a network is compact and contains only 261,536 trainable parameters. Having such a compact network allows for deployment on a wide array of devices, such as, for example, mobile devices.

To train such a network, triplet loss function can be used. An example equation for determining such loss is:

$$L(a^p, p^r, n^r) = \sum_i \max(\|f^p(a_i^p) - f^r(p_i^r)\|_2 - \|f^p(a_i^p) - f^r(n_i^r)\|_2 + \alpha, 0)$$

In such an equation, a, p, and n can respectively denote a mini-batch of anchor, positive, and negative patches. In addition, such superscripts denote photograph (e.g., p) or render (e.g., r). Further, $f^p$ and $f^r$ can respectively denote embedding functions for photograph and render branches. Finally, α can denote the margin.

For each batch in a mini-batch, its three-dimensional coordinates are known in an Euclidean world space (e.g., $x(p_j) \in \mathbb{R}^3$). Given a mini-batch of anchor and positive descriptors (e.g., $f^p(a_i^p)$, $f^r(p_i^r) \in [0, N]$ where N is a batch size), a subset of possible negatives (e.g., (K)) can be selected. This subset of possible negatives can be farther than m meters away from the anchor (e.g., $p_r^j = \{x(p_j^r) > m\}$).

In particular, an adaptive variant of hard negative sampling can be used such that the embedding function of the network does not collapse into a single point during training. For instance, the difficulty of randomly sampled negatives can be increased during training of the network. Classic hard negative mining uses a randomly chosen descriptor (e.g., $p_j$) as a negative example (e.g., $n_j$) for each anchor descriptor (e.g., $a_i$) if, and only if a triplet loss criterion is violated. An example equation for when the triplet loss criterion is violated is:

$$\|a_i - p_j\|_2 < \|a_i - p_i\|_2 + \alpha$$

In such an equation, an anchor descriptor (e.g., $a_i = f^p(a_i^p)$) can be denoted as calculated from an image patch using a photo encoder such that similarity can be designated for $p_j = f^r(p_j^r)$, and $p_i = f^r(p_i^r)$.

This can be built upon to carry out the adaptive variant of hard negative sampling. In particular, for each anchor descriptor (e.g., $a_i$), a randomly chosen descriptor (e.g., $p_j$) can be selected as a negative example (e.g., $n_j$) when $\|a_i - p_j\|_2 < d^+ - (d^+ - (n_{min} + \varepsilon)) \cdot \lambda$. In such an equation, λ is a tunable parameter using an interval (e.g., [0,1]) that defines a difficulty of the negative mining. The epsilon is a small positive constant, close to zero. In addition, $d^+$ denotes a distance between the anchor and positive plus margin (e.g., $d^+ = \|a_i - p_j\|_2 + \alpha$). Further, $n_{min}$ denotes the distance between the anchor and the hardest negative (e.g., $n_{min} = \min_{p_j} \|a_i - p_j\|_2$). For instance, when λ=0, the adaptive variant of hard negative sampling equation is reduced to random hard negative sampling as in the classic hard negative mining equation. When λ=1, the adaptive variant of hard negative sampling equation is forced to select $p_j$ as a negative only if it is equal to the hardest negative (e.g., $n_{min}$). In such a case, the sampling is similar to that used in HardNet. Utilizing parameter λ allows for selection of harder negatives as training progresses. In particular, training can be started with λ=0 and then increases made to λ with each new epoch, up to a maximum hardness. As one example, in one embodiment, a maximum of λ=0.23 can be defined with a margin set to α=0.2 as well as a minimum distance in three-dimensions set to m=50 m.

Such a cross-domain triplet loss defined with having an anchor as an image and the positive and negative patches as renders allows for optimization of a loss function between the image and render descriptors. However, a variant with auxiliary loss functions can also be used to optimize distances between image-image and render-render descriptors. An example equation for determining such loss is:

$$L_{aux} = L(a^p, p^r, n^r) + L(a^p, p^p, n^p) + L(a^r, p^r, n^r)$$

In embodiments, such a variant can perform best in cross-domain matching scenarios.

Matching component 214 can be utilized to match images with renders. In particular, the cross-domain embedding function can be used to match an input image with a render. As an example, an input image can be input into a model (e.g., a neural network trained using techniques described herein). The model can then be used to aid descriptor matching to compare similarity between descriptors of the input image and renders. Such descriptors can generally be represented using a feature vector and/or feature map. For instance, patches of the input image and patches of the renders can be compared using descriptors generated by the model. Such patches can be an area around keypoints in the input image and keypoints in the renders. Such keypoints can be, for example, areas of interest in an image. Some non-limiting examples of such keypoints can be transition points based on color (e.g., sky and land), interesting structure features (e.g., mountain peak, rock, glacier, etc.), etc. In this way, the cross-domain embedding function of the model can be used to generate descriptors, which can be used to find matching patches between the input image and the renders.

For instance, in accordance with generating a set of renders in relation to an input image, general location information related to the input image can be used to identify a corresponding general location on a terrain model. This set of renders can be generated with various fields-of-view based on the corresponding general location on a terrain model. By way of example only, a set of 12 images can be rendered with a field-of-view of 60° rotated by 30° around a vertical axis. In embodiments, the input image can be scaled by a scale factor (e.g., s). This scale factor can be proportional to the field-of-view (e.g., f: $s=(f \cdot M)/(\pi \cdot I_w)$). In such an equation, M can be the maximum resolution that corresponds to a field-of-view of 180°. In addition, $I_w$ can generally be defined as the width of the image. A keypoint detector (e.g., SIFT) can be used to determine keypoints in the input image and/or renders. Based on the detected keypoints, a patch can be taken around each keypoint. For example, a 64×64 patch can be taken around each keypoint. These patches can then be input into the model to generate descriptors. Augmentation engine 208 can be used to determine a camera pose and generate an augmented reality scene in relation to an outdoor scene utilizing the determined camera pose. As shown, augmentation engine 208 can include camera pose component 216 and application component 218. The foregoing components of the augmentation engine can be implemented, for example, in operating environment 100 of FIG. 1A and/or operating environment 112 of FIG. 1B. In particular, these components may be integrated into any suitable combination of user devices 102a and 102b through 102n and server(s) 106 and/or user device 114. It should be appreciated that while camera pose component and application component are depicted as a separate components, in implementations, the functionality of these components can be performed using a single components and/or additional components.

Camera pose component 216 can be utilized to determine a best camera pose based on descriptors of an input image and renders indicating matched patches between the input image and renders. In particular, the camera pose component 216 can receive descriptors related to an input image. Such descriptors can be for one or more patches of the input image and/or one or more patches of renders. From these descriptors, a set of top candidates can be determined. These top candidates can be the best matches between the input image and the renders. To determine the best matches, a voting strategy can be used. For example, this voting strategy can be used to determine a number of mutual nearest neighbor matches of the renders with the input image. To determine such mutual nearest neighbor matches, a difference between the renders descriptors and the image descriptor can be used (e.g., smallest difference).

In some embodiments, the top three candidate renders can be selected. Using three candidate renders can be advantageous because an image is unlikely to span over more than three consecutive renders, covering a field-of-view of 120°. For each of the top candidates, the two-dimensional points can be unprojected from the rendered images to three-dimensions using rendered camera parameters and a depth map. Then a full camera pose can be determined for the input image with respect to the three-dimensional coordinates. This determination can be made using, for example, an OpenCV implementation of EpnP algorithm.

From the top candidate renders, a best pose can be selected. In particular, the best pose can be the pose that minimizes the reprojection error while having a reasonable (e.g., low) number of inliers. For instance, if a candidate pose has more than N=60 inliers, then the render with the lowest reprojection error can be selected. If none are found, then the threshold of N can be lowered, and the best pose can be determined in a new iteration. When there are no candidate poses with at least N=20 inliers, then the algorithm can be deemed unsuccessful.

Finally, the matches (e.g., all matches) can be reprojected into the camera plane using the best pose. The matches that are within the image frame can be selected. In some embodiments, the matching process can be repeated to obtain a refined pose. For instance, the matching process and EpnP can be repeated.

In some embodiments, the camera pose component 216 can receive information related to keypoints of an image received from a camera stream and at least one render (e.g., render with a synthetic view from the local terrain model and ortho-photo textures). For instance, the camera pose component can receive information about feature(s) that match across domains using the model to extract local features on detected keypoints. The matched features can then be unprojected from a render using camera parameters and a depth map. Further, matches between two-dimensional keypoints and three-dimensional rendered keypoints can be used to estimate the camera pose. Camera pose component 216 can use this estimated camera pose to update the camera position and rotation to improve the alignment of the input camera stream with the terrain model.

Application component 218 can generate an augmented reality scene in relation to an outdoor scene utilizing a determined camera pose. For example, application component 218 can take a camera stream and render an augmented reality scene over the outdoor scene. For example, the augmented reality scene can include information needed to visualize any of contour lines, gravel roads, trails. Application component 218 can further apply the determined camera pose for image annotation, dehazing, relighting, refocusing, and/or depth-of-field simulation.

Figure 3:
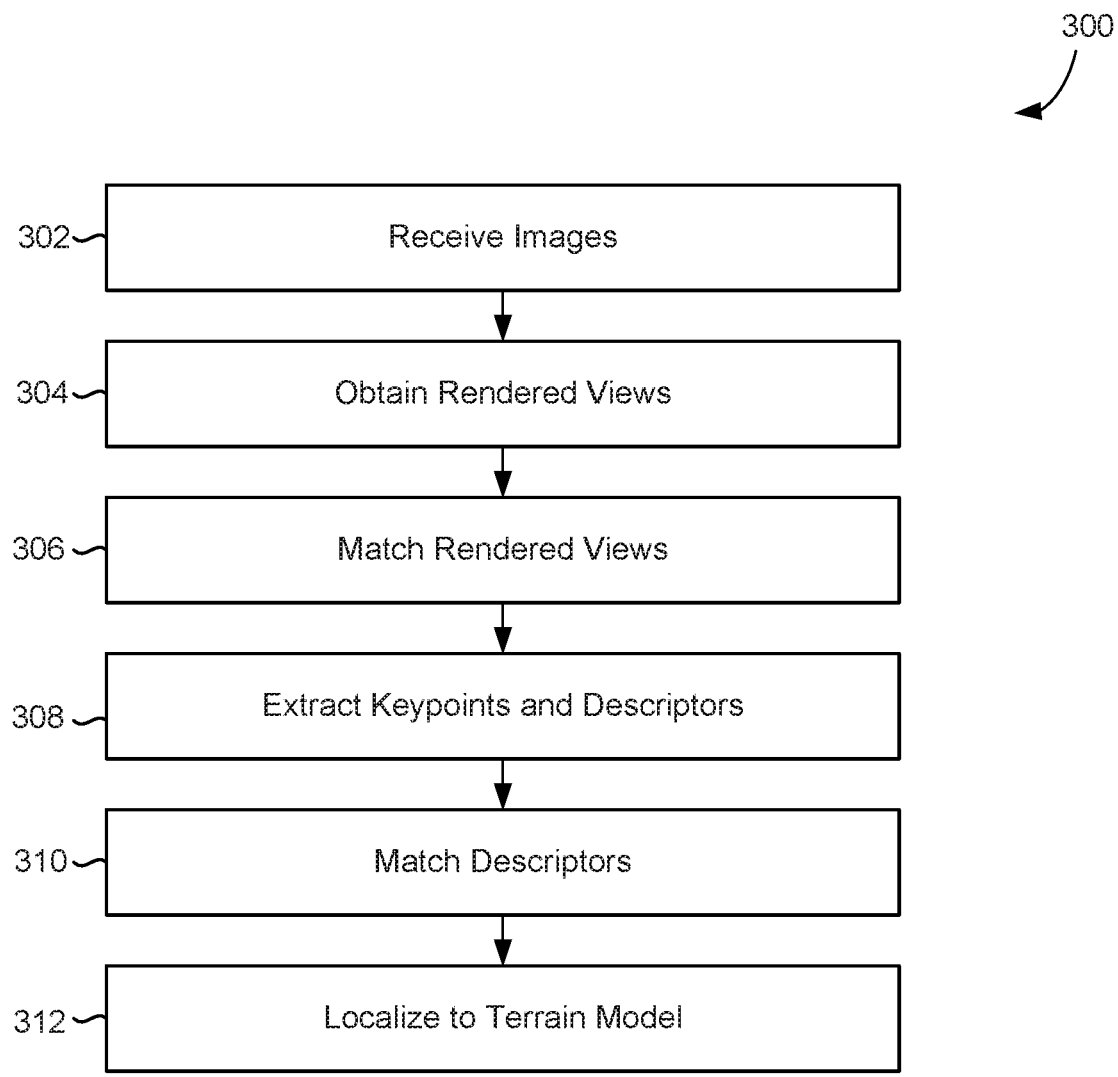
FIG. 3 illustrates a process flow showing an embodiment for generating a dataset for use in training a model with a robust cross-domain embedding function, in accordance with embodiments of the present disclosure.

With reference to FIG. 3, a process flow is provided showing an embodiment of method 300 for generating a dataset for use in training a model with a robust cross-domain embedding function, in accordance with embodiments of the present disclosure. Method 300 can be performed, for example by data component 210 of augmented scene system 204, as illustrated in FIG. 2.

At block 302, images are received. Such images can be received, for example, from data store and/or from a remote device, such as from a server or a user device. In some embodiments, these images can come from collections of internet images. Such images can have viewpoint changes, different weather and seasonal changes, and/or different illumination. The images can be input within a given rectangle of 10×10 km.

At block 304, rendered views are obtained. For example, the rendered views can be from the same area as the images. These rendered views can be generated using panoramic images that are sampled 1 km apart on a regular grid. For each sampled position, a set of images can be rendered. As an example, six renders can be generated using a 60° field-of-view with each rendered image rotated 60° around a vertical axis. Information related to the rendered views can also be obtained. This information can comprise a depth map, full camera pose, detected keypoints, and/or descriptors. At block 306, rendered views are matched. For instance, for the rendered views, matches can be determined using terrain geometry. In some embodiments, matches can be made using stored camera poses and depth maps that are related to the rendered views. Such matching can be used, for example, to generate an initial sparse three-dimensional model using the rendered views.

At block 308, keypoints and descriptors are extracted. These keypoints and descriptors can be extracted from the images. For example, such keypoints and/or descriptors can be obtained using, for example, the baseline feature descriptor such as D2Net.

At block 310, descriptors are matched. For instance, descriptors can be matched between the images (e.g., image-image) and/or rendered views (e.g., image-renders). The images can be matched using descriptor matching. As used herein, descriptor matching can generally be the comparison of descriptors (e.g., feature vector and/or feature map) from an image and/or render. For instance, a first descriptor can be compared to a second descriptor. When the descriptors are close in value, the first and second descriptors can indicate a match. When the descriptors are not close in value, the first and second descriptors can indicate there is not a match. In embodiments, a nearest neighbor search approach is used. For example, for each descriptor from a photograph, the distance, e.g., the L2norm, is calculated to all descriptors from the rendered image. The closest rendered descriptor is identified as a match. Further, in some cases, a "best buddy" matching approach is used. In this regard, the rendered descriptor must be the closest one for the photo descriptor, and the photo descriptor must also be the closest one for the rendered descriptor. Advantageously, this can filter out ambiguous and sporadic matches.

At block 312, images are localized to a terrain model. For instance, the images can be localized to a terrain model using Structure-from-Motion based on renders relating to matching descriptors. Global bundle adjustment can then be used to refine camera parameters belonging to the images and three-dimensional points. Using such a guided Structure-from-Motion technique can generate training data that aligns input images (e.g., photos) with renders (e.g., rendered images) from a terrain model. Such training data can then be used in training a robust cross-domain embedding function.

Figure 4:
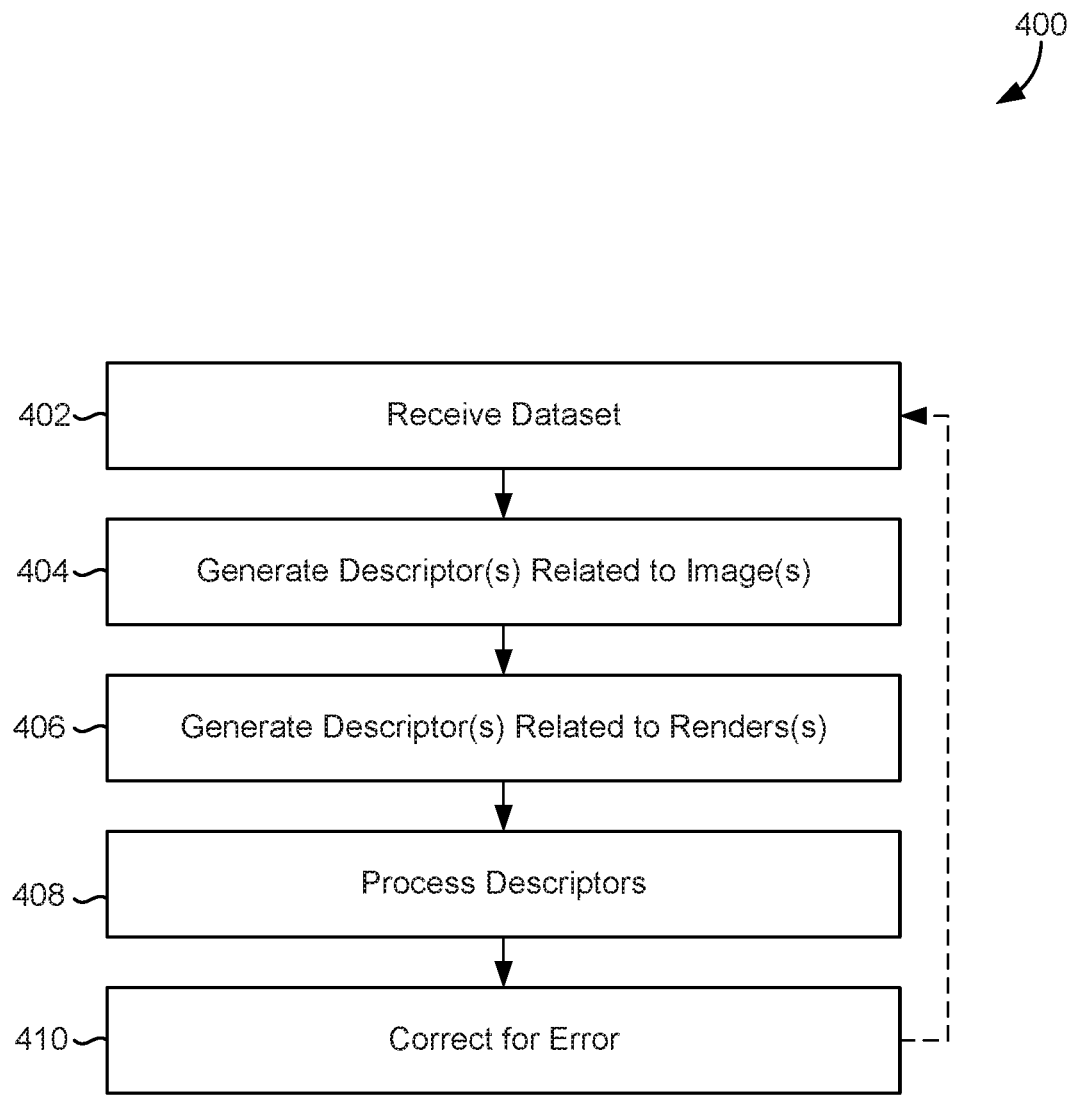
FIG. 4 illustrates a process flow showing an embodiment for training a model with a robust cross-domain embedding function, in accordance with embodiments of the present disclosure.

With reference to FIG. 4, a process flow is provided showing an embodiment of method 400 for training a model with a robust cross-domain embedding function, in accordance with embodiments of the present disclosure. Method 400 can be performed, for example by training component 212 of augmented scene system 204, as illustrated in FIG. 2.

At block 402, a dataset is received. The dataset can comprise training data. Such training data can be generated using, for example, method 300. For instance, such training data can comprise accurately aligned pairs of images (e.g., photographs) and renders from a terrain model (e.g., DEM renders). For each training photograph, precise camera pose information can be determined. As used herein, camera pose information can comprise camera translation (e.g., t), rotation (e.g., R), and intrinsic parameters (e.g., K) with respect to a reference frame of a virtual globe.

In some embodiments, a weakly supervised patch sampling method can be used to select the training data. This can result in avoiding bias in the system. Using such an approach is advantageous in the cross-domain approach of the present system because the accuracy of existing keypoint detectors in cross-domain matching can be unknown. In addition, the embedding function of the system can be used with any keypoint detector without the need for re-training the system.

At block 404, descriptor(s) related to image(s) are generated. Such descriptors can be generated using a model. This model can use a branched network architecture to account for appearance differences between the two domains (e.g., images and terrain model). This branched network can be comprised of two branches, one branch for each of the input domains (e.g., input images and terrain model) followed by a shared trunk. In embodiments, the architecture of the branched network can be a fully convolutional network with a receptive field of 63 px.

To obtain a descriptor using the network, an input patch related to an image with size 64×64 can be used. This input patch to the network can be normalized. For instance, the input patch can be normalized by subtracting the mean and dividing by its standard deviation.

At block 406, descriptor(s) related to render(s) are generated. Such descriptors can be generated using a model. This model can use the same branched network architecture that processes the images (e.g., at block 404). To obtain a descriptor using the network, an input patch related to a render with size 64×64 can be used. This input patch to the network can be normalized. For instance, the input patch can be normalized by subtracting the mean and dividing by its standard deviation.

At block 408, descriptors are processed. In particular, descriptors can be compared based on alignment. Such descriptors can generally be represented using a vector. For example, descriptors for positive patches (e.g., known matching portion) of an image and patches of renders should have highly similar descriptors generated by the model. On the other hand, descriptors for negative patches (e.g., known portion that does not match) of an image and patches of renders should not have highly similar descriptors generated by the model.

At block 410, the network is corrected for error. Error can be determined using one or more loss functions to minimize loss in the model by backwards propagation of such errors. Loss functions can include cross-domain triplet loss. Cross-domain triplet loss can generally be defined with having an anchor as an image with positive patches (e.g., known matching portion) and negative patches (e.g., known portion that does not match) as related to patches of renders. Such a loss function allows for optimization between the image and render descriptors. In some embodiments, the loss functions can comprise a variant with auxiliary loss functions that can be used to optimize distances between image-image and render-render descriptors. As indicated in FIG. 4, the foregoing blocks may be repeated any number of times to train the neural network (e.g., using different training images and corresponding renders for each iteration).

Figure 5:
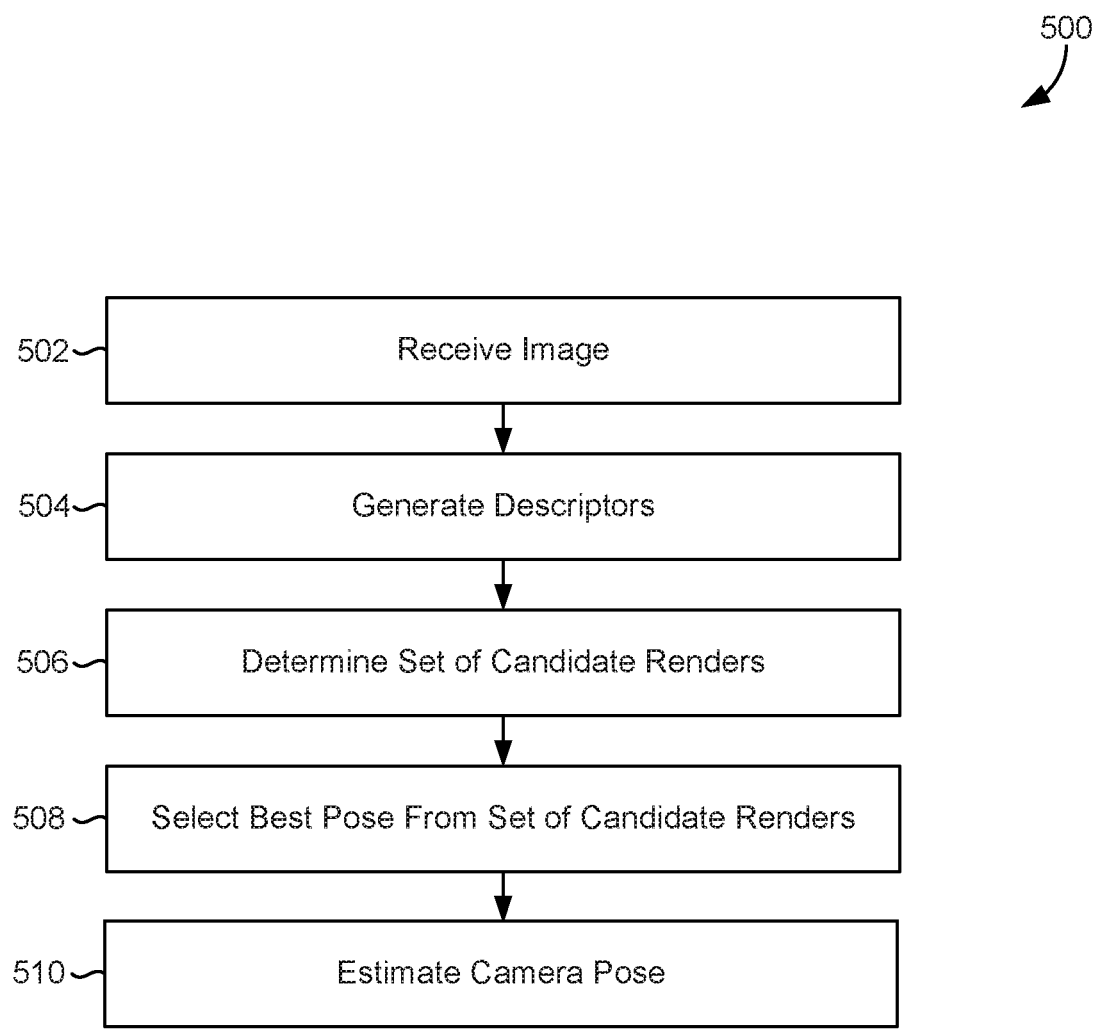
FIG. 5 illustrates a process flow showing an embodiment for estimating camera pose, in accordance with embodiments of the present disclosure.

With reference to FIG. 5, a process flow is provided showing an embodiment of method 500 for estimating camera pose, in accordance with embodiments of the present disclosure. Method 500 can be performed, for example, by augmented scene system 204, as illustrated in FIG. 2.

At block 502, an image is received. This image can be of an outdoor scene. For example, the image can be taken during a hike in the mountains. Based on information related to this input image (e.g., GPS information), a rough estimate can be determined as to where the image was taken. This information can be used to generate a set of renders (e.g., 12 renders) related to the location of the input image. This set of renders can be generated using, for example, a terrain model.

At 504, descriptors are generated. Such descriptors can be generated using a model. This model can use a branched network architecture to account for appearance differences between the two domains (e.g., images and terrain model). This branched network can be comprised of two branches, one branch for each of the input domains (e.g., input images and renders related to a terrain model) followed by a shared trunk. To obtain descriptors using the network, input patches related to the input image and/or the set of renders can be used. These input patches can have a size of 64×64. These input patches that are run through the network can also be normalized. For instance, an input patch can be normalized by subtracting the mean and dividing by its standard deviation. The network can then generate (e.g., output) a descriptor for each input patch.

At block 506, a set of candidate renders is determined. This set of candidate renders can be determined using the descriptors related to the input image and the set of renders. Such descriptors can be for one or more patches of the input image and/or one or more patches of the set of renders. These descriptors can be analyzed to determine the set of candidates. For instance, the candidates (e.g., top candidates) can be the best matches between the input image and renders. To determine the best matches, a voting strategy can be used. For example, this voting strategy can be used to determine a number of mutual nearest neighbor matches of the renders with the input image. To determine the mutual nearest neighbor matches the difference between the renders descriptors and the image descriptor can be used (e.g., smallest difference). In some embodiments, a top three candidate renders can be selected.

At block 508, a best pose is selected using the set of candidate renders. To determine the best pose, two-dimensional points from a candidate render can be unprojected and/or matched into three-dimensional points. For instance, for each of the set of candidate renders, the two-dimensional points can be unprojected from the rendered images into three-dimensions using rendered camera parameters and a depth map (e.g., which are known). Then a full camera pose can be determined for the input image with respect to the three-dimensional coordinates (e.g., based on the known camera parameters related to the candidate renders). This determination can be made using, for example, an OpenCV implementation of EpnP algorithm.

In particular, the best pose can be the pose that minimizes a reprojection error while having a reasonable (e.g., low) number of inliers. For instance, if a candidate pose has more than N=60 inliers, then the render with the lowest reprojection error can be selected. If none are found, then the threshold of N can be lowered, and the best pose can be determined in a new iteration. When there are no candidate pose with at least N=20 inliers, then the algorithm can be deemed unsuccessful.

At block 510, camera pose is estimated. For instance, all keypoints in the renders can be unprojected into the three-dimensional view and then projected back using the best pose. The points that are projected into the input image can be maintained while points that are projected outside of the input image can be discarded. These maintained points can then be used to estimate the camera pose.

Figure 6:
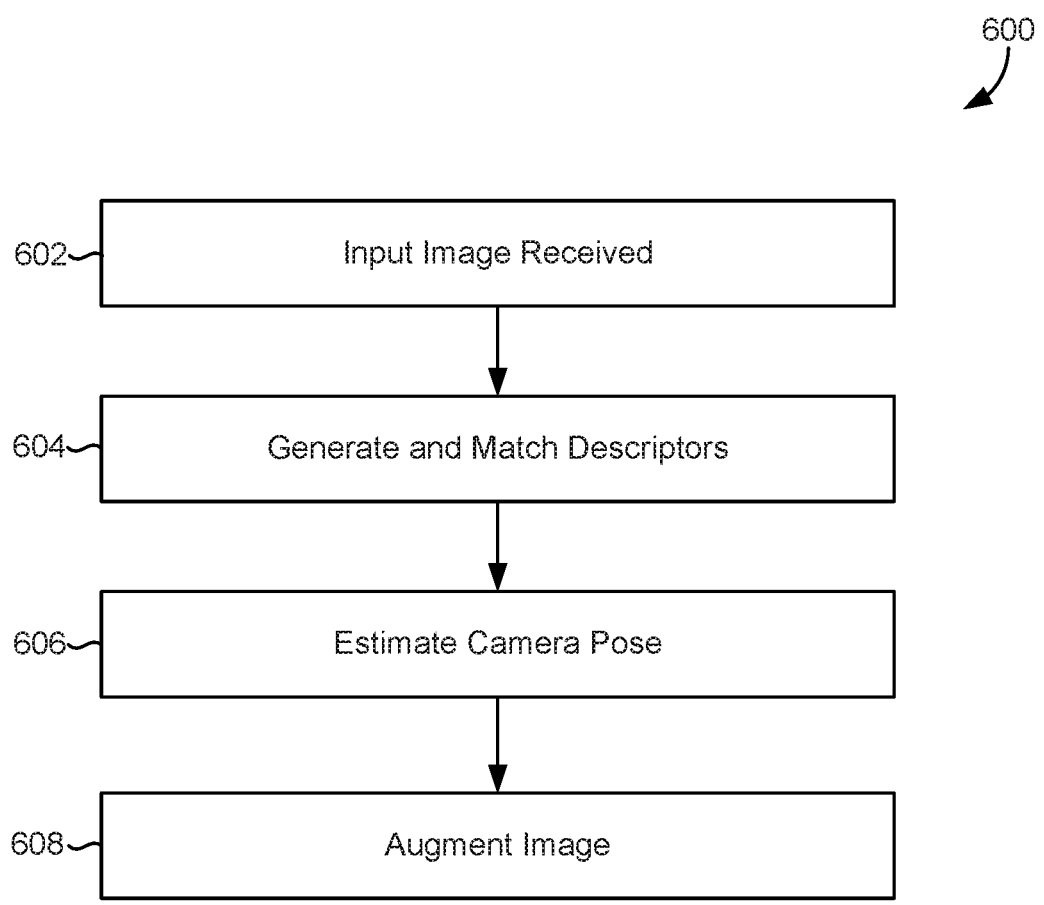
FIG. 6 illustrates a process flow showing an embodiment for generating an augmented reality scene in relation to an outdoor scene, in accordance with embodiments of the present disclosure.

With reference to FIG. 6, a process flow is provided showing an embodiment of method 600 for generating an augmented reality scene in relation to an outdoor scene, in accordance with embodiments of the present disclosure. Method 600 can be performed, for example, by augmentation engine 208 of augmented scene system 204, as illustrated in FIG. 2.

At block 602, an input image is received. This image can be of an outdoor scene. For example, the image can be taken during a hike in the mountains. Based on information related to this input image (e.g., GPS information), a rough estimate can be determined as to where the image was taken. This information can be used to generate a set of renders (e.g., using a terrain model) related to the location of the input image. For example, a set of 12 images can be rendered with a field-of-view of 60° rotated by 30° around a vertical axis.

At block 604, descriptors can be generated and matched. Such descriptors can be generated using a model. This model can use a branched network architecture to account for appearance differences between the two domains (e.g., images and terrain model). This branched network can be comprised of two branches, one branch for each of the input domains (e.g., input images and renders related to a terrain model) followed by a shared trunk. To obtain descriptors using the network, input patches related to the input image and/or the set of renders can be used. These input patches can have a size of 64×64. These input patches that are run through the network can also be normalized. For instance, an input patch can be normalized by subtracting the mean and dividing by its standard deviation. The network can then generate (e.g., output) a descriptor for the input patch.

This set of candidate renders can be determined using the descriptors related to the input image. Such descriptors can be for one or more patches of the input image and/or one or more patches of renders. These descriptors can be analyzed to determine the set of candidates. For instance, the candidates (e.g., top candidates) can be the best matches between the input image and renders. To determine the best matches, a voting strategy can be used. For example, this voting strategy can be used to determine a number of mutual nearest neighbor matches of the renders with the input image. To determine the mutual nearest neighbor matches the difference between the renders descriptors and the image descriptor can be used (e.g., smallest difference). In some embodiments, a top three candidate renders can be selected.

At block 606, camera pose is estimated. To determine the best pose, two-dimensional points can be unprojected from a render into three-dimensional points. For instance, for each of the set of candidate renders, the two-dimensional points can be unprojected from the rendered images to three-dimensions using rendered camera parameters and a depth map. In some embodiments, all keypoints in the renders can be unprojected into the three-dimensional view and then projected back using the best pose. The points that are projected into the input image can be maintained while points that are projected outside of the input image can be discarded. These maintained points can then be used to estimate the camera pose.

At block 608, the input image is augmented. The camera pose can then be used to augment information in relation to the input image. Such augmented information can include, for example, an overlay on the input image. This overlay can display information such as altitude contour lines, map features (e.g., roads, trails, etc.), three-dimensional created content (e.g. educational geographic-focused features), three-dimensional content animated in time, etc.

Figure 7:
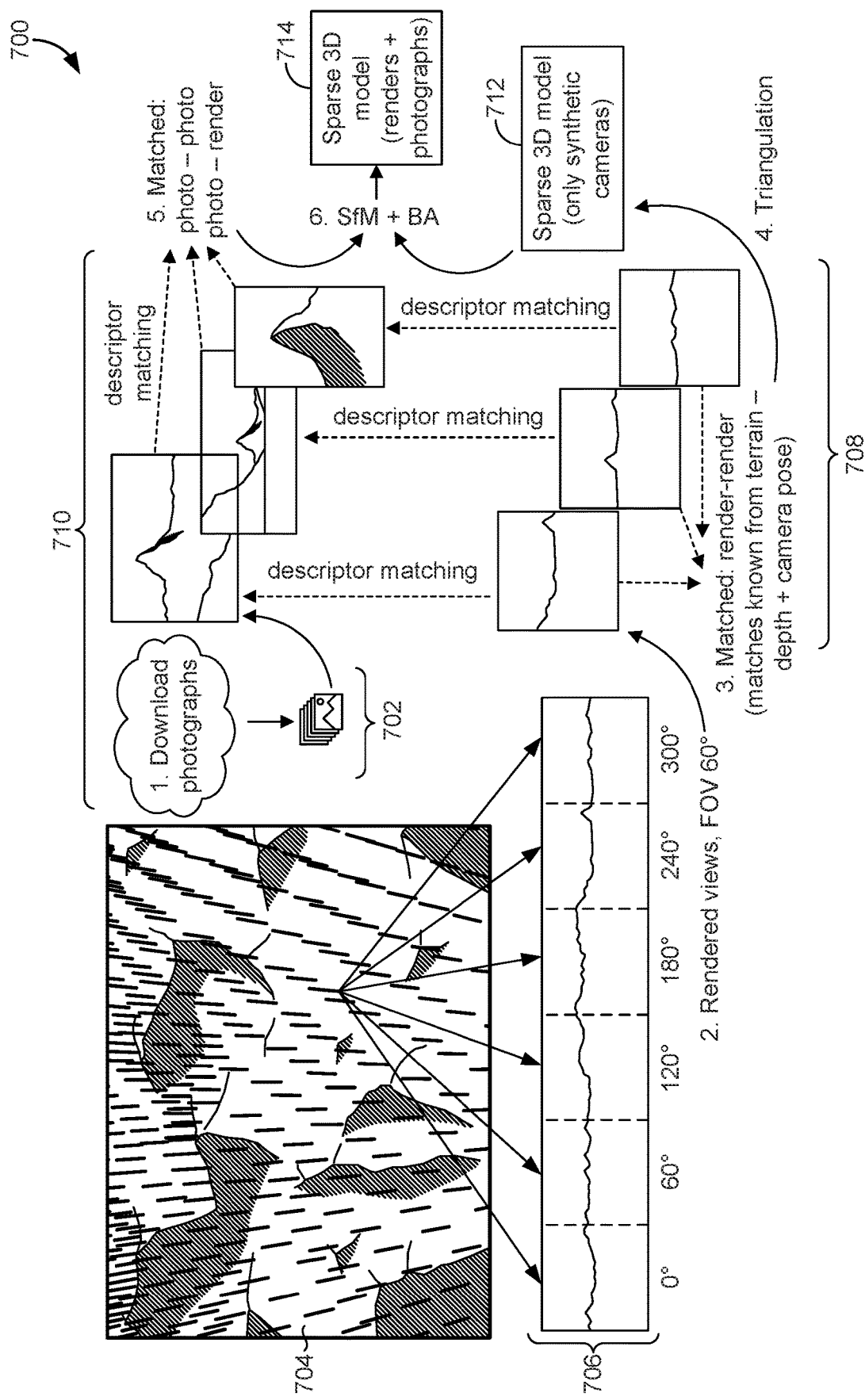
FIG. 7 illustrates an example process for generating a dataset for use in training a model with a robust cross-domain embedding function, in accordance with embodiments of the present disclosure.

FIG. 7 depicts illustrative process 700 for generating a dataset for use in training a model with a robust cross-domain embedding function, in accordance with embodiments of the present disclosure. In particular, a set of images 702 can be downloaded. Such a set of images 702 can be received, for example, from data store and/or from a remote device, such as from a server or a user device. In some embodiments, this set of images 702 can come from collections of internet images. Such images can have viewpoint changes, different weather and seasonal changes, and/or different illumination. The set of images 702 can be in relation to a particular location. For instance, the set of images 702 can be from within a given rectangle of 10×10 km.

Based on the location of the set of images 702, terrain model 704 can be used to obtain renders 706. Renders can generally be rendered images generated using panoramic images from generated using panoramic images that are sampled 1 km apart on a regular grid that are sampled 1 km apart on a regular grid. In embodiments, and as depicted, renders 706 can comprise six images with a 60° field-of-view each rotated 60° around a vertical axis.

Matching 708 can be performed between renders 706. For instance, matches between renders 706 can be determined using terrain geometry. In particular, matches can be made using stored camera poses and depth maps that are related to the rendered views. Such matching can be used, for example, to generate an initial sparse three-dimensional model 712 using the rendered views. Matching 710 can also be performed between images from the set of images 702 and/or between images from the set of images 702 and renders 706. The images can be localized to a terrain model using Structure-from-Motion to generate an updated sparse three-dimensional model 714.

Figure 8:
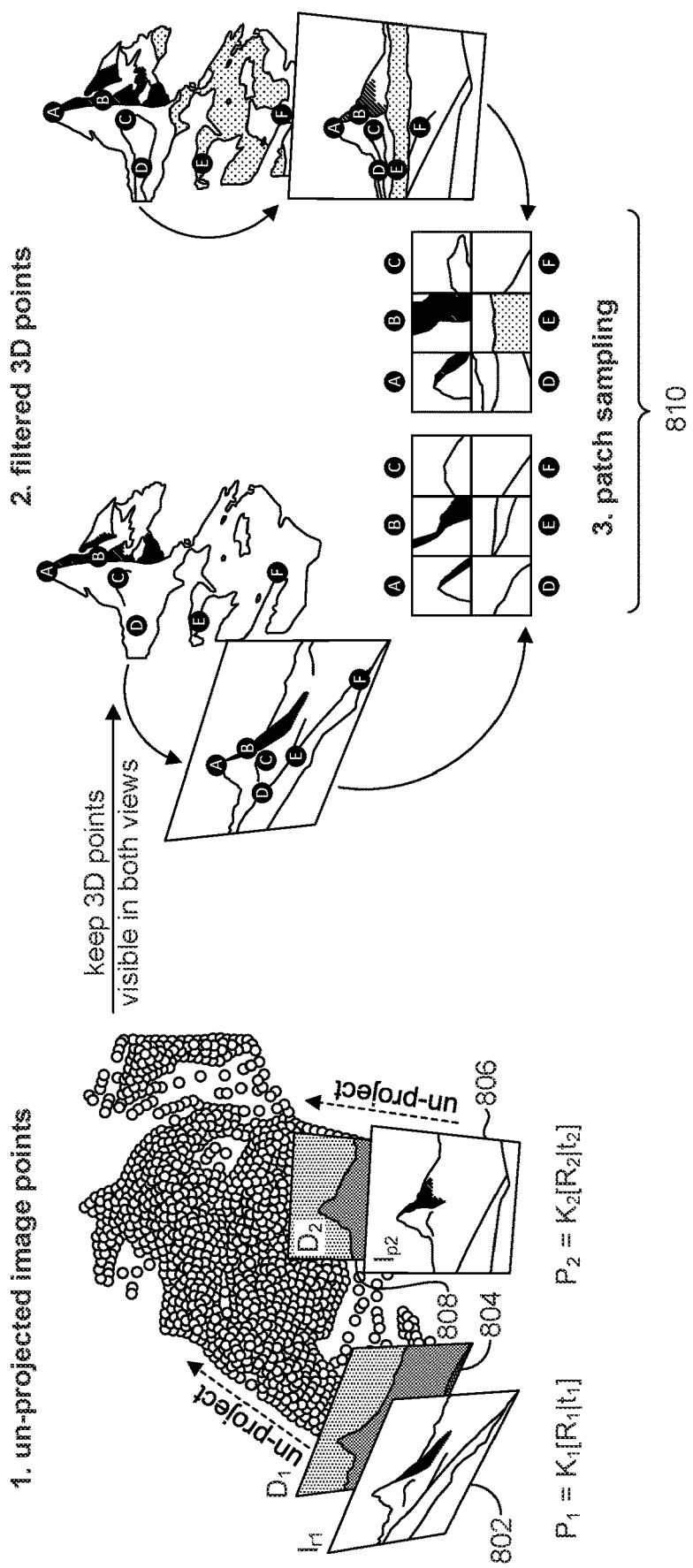
FIG. 8 depicts an illustrative generation of corresponding patches from multiple views, in accordance with embodiments of the present disclosure.

FIG. 8 depicts an illustrative generation of corresponding patches from multiple views, in accordance with embodiments of the present disclosure. Each image in the dataset can contain a ground-truth camera pose (e.g., $P=K[R|t]$) which can transform synthetic world coordinates into the camera space. In particular, for a pair of image-render, render 802 (e.g., $I_{r1}$) and image 806 (e.g., $I_{p2}$), two-dimensional image points can be unprojected into three-dimensions using rendered depth map 804 (e.g., $D_1$) and depth map 808 (e.g., $D_2$) along with ground truth camera poses (e.g., $P_1$ and $P_2$). For each domain, the three-dimensional points visible in both views can be kept while those outside such visibility can be discarded which results in filtered points 810. Such filtered points 810 can then be use match images to renders. These matched images and renders can be used, for example, in training a model with a cross-domain embedding function.

Figure 9:
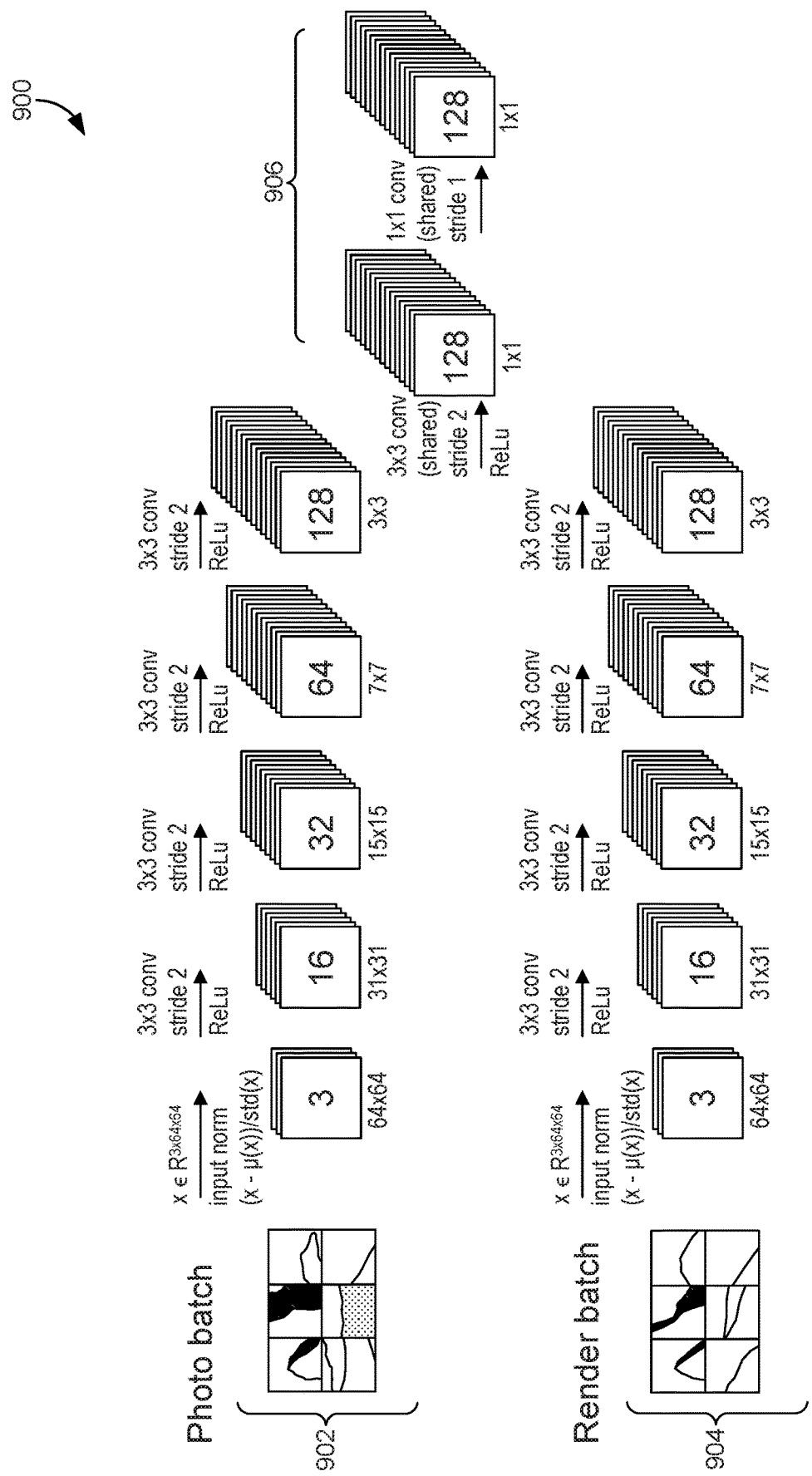
FIG. 9 depicts an illustrative architecture that can used for a model with a cross-domain embedding function, in accordance with embodiments of the present disclosure.

FIG. 9 depicts an illustrative architecture that can used for a model 900 with a cross-domain embedding function, in accordance with embodiments of the present disclosure. In particular, to account for appearance differences between the two domains (e.g., images and terrain model), a branched network can be used for the architecture of model 900. This branched network can be comprised of two branches, first branch 902 can be for input images and second branch 904 can be for renders based on a terrain model followed by shared trunk 906. In embodiments, the architecture of the branched network can be a fully convolutional network with a receptive field of 63 px. To obtain a descriptor using the network, an input patch with size 64×64 can be used. Advantageously, such a network is compact and contains only 261,536 trainable parameters. Having such a compact network allows for deployment of a wide array of devices, such as, for example, mobile devices.

Figure 10:
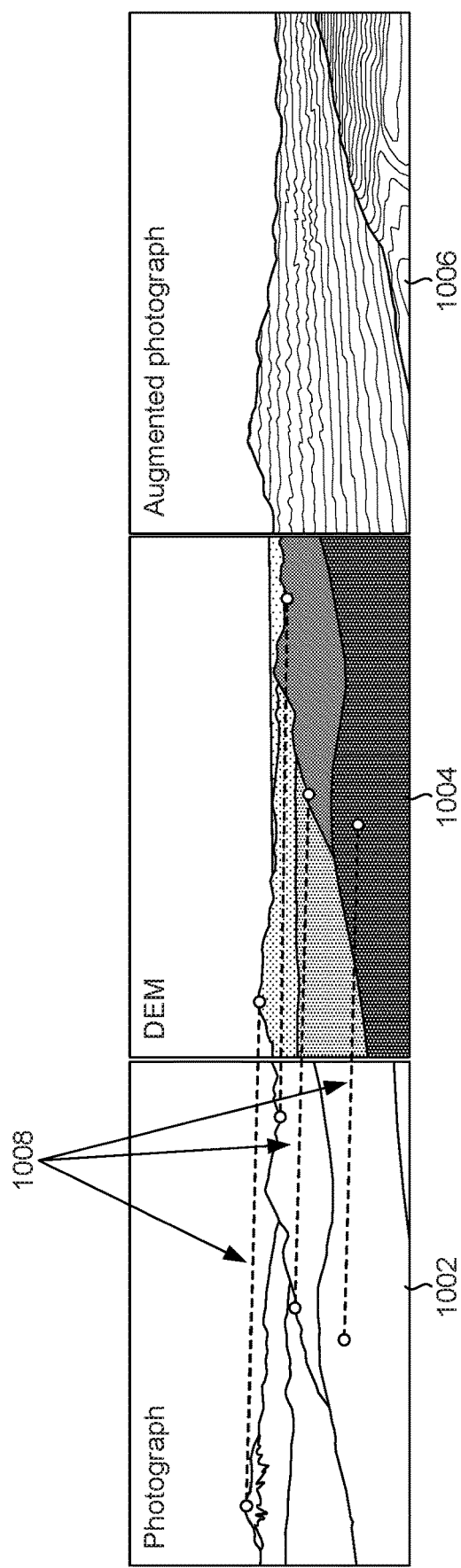
FIG. 10 depicts an illustrative augmented reality scene in relation to an outdoor scene, in accordance with embodiments of the present disclosure.

FIG. 10 depicts an illustrative augmented reality scene in relation to an outdoor scene, in accordance with embodiments of the present disclosure. Image 1002 can be received. For example, image 1002 can be received from a camera stream of a camera. Techniques as described herein can be used to determine a camera pose (e.g., position and orientation of a camera in a three-dimensional space). For instance, feature matching can be used between the image 1002 and terrain map 1004. Upon obtaining camera pose information, augmented image 1006 can be generated. For example, augmented image 1006 can display contour lines.

Figure 11:
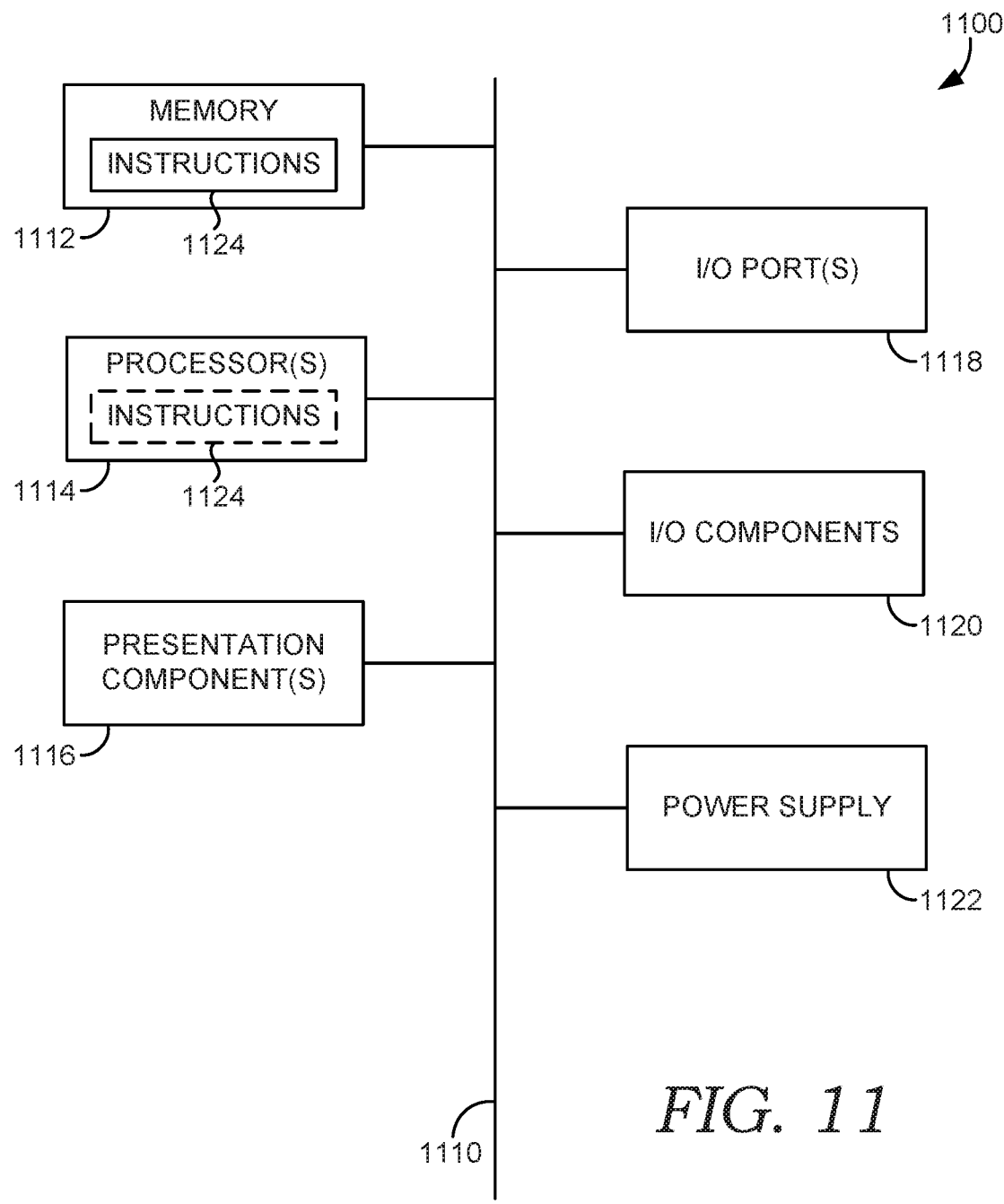
FIG. 11 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 11, an illustrative operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 11 is merely illustrative of an example computing device that can be used in connection with one or more embodiments of the present disclosure. Distinction is not made between such categories as "workstation," "server," "laptop," "hand-held device," etc., as all are contemplated within the scope of FIG. 11 and reference to "computing device."

Computing device 1100 typically includes a variety of non-transitory computer-readable media. Non-transitory Computer-readable media can be any available media that can be accessed by computing device 1100 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. As depicted, memory 1112 includes instructions 1124. Instructions 1124, when executed by processor(s) 1114 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Illustrative presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable media having a plurality of executable instructions embodied thereon, which, when executed by one or more processors, cause the one or more processors to perform operations comprising:
  receiving an image, wherein the image has corresponding location information;
  receiving a set of renders based on a terrain model, the set of renders related to the location information of the image;
  determining keypoints from the image and each of the set of renders;
  generating, with a trained model, a first set of descriptors including a descriptor for each keypoint from the image and a second set of descriptors including a descriptor for each keypoint from the set of renders, the trained model trained, using a cross-domain embedding function, to align an input image to at least a portion of a terrain model;
  identifying candidate renders from the set of renders based on comparing the first set of descriptors related to the image with the second set of descriptors related to the set of renders; and estimating camera pose related to the image using known camera pose information related to the candidate renders.

2. The media of claim 1, the operations further comprising:
generating the set of renders, each of the set of renders comprising a rendered image with a filed-of-view of sixty degrees rotated by thirty degrees around a vertical axis.

3. The media of claim 1, the operations further comprising:
extracting image patches based on the determined keypoints from the image;
extracting render patches based on the determined keypoints from the set of renders; and
inputting the image patches and render patches into a trained model related to the cross-domain embedding function to generate the descriptors for each keypoint.

4. The media of claim 1, the operations further comprising:
generating an augmented image using the camera pose related to the image, wherein the augmented image comprises the image and an overlay of augmentation information.

5. The media of claim 4, wherein the augmentation information comprises at least one of contour lines, gravel roads, and trails.

6. The media of claim 4, further comprising:
outputting the augmentation image for display via a device.

7. The media of claim 1, the operations further comprising:
training a model related to the related to the cross-domain embedding function.

8. The media of claim 7, further comprising:
generating training data to train the model, wherein the training data comprises aligned pairs of training images and training renders based on the terrain model.

9. A computer-implemented method, the method comprising:
receiving one or more image patches related to an image, wherein the image has corresponding location information;
receiving one or more render patches related to a set of renders based on a terrain model, the set of renders related to the location information of the image;
generating, with a trained model, a first set of descriptors including a descriptor for each of the one or more image patches and a second set of descriptors including a descriptor for each of the one or more render patches, the trained model trained, using a cross-domain embedding function, to align an input image to at least a portion of a terrain model;
identifying candidate renders from the set of renders based on comparing the first set of descriptors related to the image with the second set of descriptors related to the set of renders; and
estimating camera pose related to the image using known camera pose information related to the candidate renders.

10. The computer-implemented method of claim 9, further comprising:
generating the set of renders, each of the set of renders comprising a rendered image with a filed-of-view of sixty degrees rotated by thirty degrees around a vertical axis.

11. The computer-implemented method of claim 9, further comprising:
determining the image patches based on image keypoints in the image; and
determining the render patches based on render keypoints in the set of renders.

12. The computer-implemented method of claim 11, further comprising:
generating an augmented image using the camera pose related to the image, wherein the augmented image comprises the image and an overlay of augmentation information; and
outputting the augmentation image for display via a mobile device.

13. The computer-implemented method of claim 12, wherein the augmentation information comprises at least one of contour lines, gravel roads, and trails.

14. The computer-implemented method of claim 9, wherein estimating the camera pose further comprises:
matching two-dimensional points of the candidate renders in relation to a three-dimensional model using rendered camera parameters and a depth map related to the candidate renders; and
determining the camera pose for the image with respect to the three-dimensional model.

15. The computer-implemented method of claim 9, further comprising:
training a model related to the cross-domain embedding function.

16. The computer-implemented method of claim 15, wherein the model is trained using a neural network corrected using cross-domain triplet loss.

17. The computer-implemented method of claim 15, further comprising:
generating training data to train the model, wherein the training data comprises aligned pairs of training images and training renders based on the terrain model.

18. A computing system comprising:
generating, using a trained model, one or more image descriptors related to an image, the trained model trained, using a cross-domain embedding function, to align an input image to at least a portion of a terrain model, and wherein the image is of an outdoor scene in a location;
matching the one or more image descriptors related to the image with one or more render descriptors related to a set of renders generated based on the terrain model, the set of renders related to the location of the image; and
estimating a camera pose for the image based on the one or more render descriptors matched to the one or more image descriptors.

19. The system of claim 18, further comprising:
generating training data for training a model related to the cross-domain embedding function; and
training the model related to the cross-domain embedding function.

20. The system of claim 18, further comprising:
generating an augmented image using the camera pose related to the image, wherein the augmented image comprises the image and an overlay of augmentation information; and
displaying the augmentation image.

* * * * *

UNITED STATES PATENT AND TRADEMARK OFFICE
CERTIFICATE OF CORRECTION

PATENT NO. : 11,568,642 B2
APPLICATION NO. : 17/068429
DATED : January 31, 2023
INVENTOR(S) : Michal Lukác et al.

It is certified that error appears in the above-identified patent and that said Letters Patent is hereby corrected as shown below:

In the Claims

In Column 23, Line 33: In Claim 7, delete "related to the related to the" and insert -- related to the --.

Signed and Sealed this
Twenty-eighth Day of March, 2023

Katherine Kelly Vidal
*Director of the United States Patent and Trademark Office*